US012421039B2

(12) United States Patent
Zhang et al.

(10) Patent No.: US 12,421,039 B2
(45) Date of Patent: Sep. 23, 2025

(54) AUTOMATIC HIGH-SPEED STACKING MACHINE

(71) Applicant: NANTONG SIRUI ENGINEERING CO., LTD., Jiangsu (CN)

(72) Inventors: Yanan Zhang, Jiangsu (CN); Yajun Ding, Jiangsu (CN); Bing Zong, Jiangsu (CN); Linlin Pei, Jiangsu (CN); Qi Yu, Jiangsu (CN); Zhigao Wang, Jiangsu (CN); Dongsheng Lu, Jiangsu (CN); Peng Tang, Jiangsu (CN)

(73) Assignee: NANTONG SIRUI ENGINEERING CO., LTD., Jiangsu (CN)

( * ) Notice: Subject to any disclaimer, the term of this patent is extended or adjusted under 35 U.S.C. 154(b) by 0 days.

(21) Appl. No.: 18/650,599

(22) Filed: Apr. 30, 2024

(65) Prior Publication Data
US 2024/0279006 A1 Aug. 22, 2024

Related U.S. Application Data

(63) Continuation of application No. PCT/CN2023/141835, filed on Dec. 26, 2023.

(30) Foreign Application Priority Data

Dec. 26, 2022 (CN) .......................... 202211671414.8

(51) Int. Cl.
*B65G 1/06* (2006.01)
*B65G 1/14* (2006.01)
*B65G 57/02* (2006.01)

(52) U.S. Cl.
CPC ............... *B65G 1/065* (2013.01); *B65G 1/14* (2013.01); *B65G 57/02* (2013.01)

(58) Field of Classification Search
CPC ........ B65G 1/065; B65G 1/14; B65G 1/0492; B65G 1/0414
(Continued)

(56) References Cited

U.S. PATENT DOCUMENTS

| 4,595,329 A * | 6/1986 | Marques ................. B65G 1/04 414/807 |
| 4,893,401 A | 1/1990 | Viani |

(Continued)

FOREIGN PATENT DOCUMENTS

| CN | 108538566 A | 9/2018 |
| CN | 110193835 A | 9/2019 |

(Continued)

OTHER PUBLICATIONS

International Search Report of corresponding patent Application No. PCT/CN2023/141835, mailed Mar. 22, 2024, 3 pages.

*Primary Examiner* — Gregory W Adams
(74) *Attorney, Agent, or Firm* — Cooper Legal Group, LLC (57) ABSTRACT

An automatic high-speed stacking machine is disclosed, including a loading unit, a precision positioning unit, a stacking unit, a grabbing unit and a feeding unit. The feeding unit includes a platen configured to place silicon steel sheet stack; a material warehouse configured to store the platen containing the silicon steel sheet stack. An area of a side of the material warehouse is defined as a reclaiming area, and an area of a side of the loading unit is defined as a loading area. A skip car moving back and forth between the reclaiming area and the loading area is configured to take out and send the platen containing the silicon steel sheet stack from the material warehouse to the loading area, or send an empty platen back to the material warehouse.

5 Claims, 3 Drawing Sheets

(58) Field of Classification Search
USPC .................................................. 414/279, 277
See application file for complete search history.

(56) References Cited

U.S. PATENT DOCUMENTS

| | | | | |
|---|---|---|---|---|
| 5,096,355 | A * | 3/1992 | Schroder | B65G 1/0492 |
| | | | | 414/277 |
| 7,931,431 | B2 * | 4/2011 | Benedict | B63B 25/22 |
| | | | | 414/137.1 |
| 8,047,756 | B2 * | 11/2011 | Tuffs | B66F 9/063 |
| | | | | 198/463.3 |
| 8,157,498 | B2 * | 4/2012 | Stolzer | B65G 1/0485 |
| | | | | 414/277 |
| 9,499,339 | B2 * | 11/2016 | Roberto | B65G 1/0492 |
| 11,117,752 | B2 * | 9/2021 | Foster | B61B 13/12 |

FOREIGN PATENT DOCUMENTS

| | | |
|---|---|---|
| CN | 110329764 A | 10/2019 |
| CN | 113593875 A | 11/2021 |
| CN | 115966394 A | 4/2023 |

* cited by examiner

AUTOMATIC HIGH-SPEED STACKING MACHINE

CROSS-REFERENCE TO RELATED APPLICATION

This application is a continuation of PCT application no. PCT/CN2023/141835, filed on Dec. 26, 2023, which claims the priority and benefit of China patent application no. 202211671414.8, filed on Dec. 26, 2022. The entireties of PCT application no. PCT/CN2023/141835 and China patent application no. 202211671414.8 are hereby incorporated by reference herein and made a part of this specification.

TECHNICAL FIELD

The present application relates to a technical field of silicon steel sheet production, and, more particularly, to an automatic high-speed stacking machine.

BACKGROUND ART

A conventional method for processing iron cores of transformer silicon steel sheets includes cutting and stacking silicon steel sheets along a transverse cutting line. The transverse cutting line of the silicon steel sheet generally consists of a loading device, a feeding device, a feeding channel, a punching device, a V-shaped scissors, a shearing device, a collecting device, and a control center, in which the feeding device, the punching device, the V-shaped scissors, and the shearing device are sequentially provided on the feeding channel, cut along the transverse cutting lines, manually transported to a stacking workplace, and stacked into iron cores. However, in existing technologies, manual stacking is mostly adopted, which suffers from low work efficiency and high labor intensity.

Therefore, in view of this, an automatic stacking system for silicon steel sheet iron core is proposed in patent CN113593875A, which includes a platen, a loading unit, a precision positioning unit, a stacking unit, and a gripping unit. One loading unit is located in a middle position, a total of two precision positioning units are located on two sides of the loading unit, respectively, and a total of two stacking units are located on two sides of the two precision positioning units, so that an entire automatic stacking system is sequentially composed of the loading unit, the precision positioning unit, and the stacking unit from a middle portion to two sides.

The stacking system mentioned above can achieve automatic stacking of silicon steel sheet stacks, and greatly reduce manual labor amount and improve work efficiency, however, there are still certain shortcomings. In particular, for a design of the loading unit, a combination of loading supports, conveying supports, conveying rollers, and other components are adopted to achieve loading, however, such a kind of loading unit can only achieves a purpose of automatically transporting material piles from the conveying supports to the loading supports, but the stacks on the conveying supports still needs to be manually transported, which still requires much manpower to transport materials, resulting high manual labor intensity, low manual stacking efficiency and relatively low overall stacking efficiency.

SUMMARY

The technical problem to be solved by the present application is to provide an automatic high-speed stacking machine that can achieve automatic feeding of material piles, reduce manual labor, and improve a stacking efficiency.

In order to solve the technical problem mentioned above, the technical solution of the present application is: an automatic high-speed stacking machine, comprising a loading unit, a precision positioning unit, a stacking unit and a grabbing unit, wherein one loading unit is located in a middle position, two precision positioning units are respectively located at two sides of the loading unit, and two stacking units are respectively located at two sides of the two precision positioning units, so that the loading unit, the precision positioning unit, and the stacking unit are sequentially arranged from a middle portion to two sides of the automatic high-speed stacking machine, characterized by further comprising a platen, configured to receive a silicon steel sheet stack;
a material warehouse, configured to store the platen having the silicon steel sheet stack;
wherein an area beside the material warehouse is defined as a reclaiming area, and an area of beside the loading unit is defined as a loading area;
a skip car moving back and forth between the reclaiming area and the loading area, configured for fetching and send the platen having the silicon steel sheet stack from the material warehouse to the loading area, or to send an empty platen back to the material warehouse; and
a guide rail, configured to provide a path for the skip car to move back and forth between the reclaiming area and the loading area.

Further, the material warehouse comprises a plurality of material supports that are arranged in parallel with each other, and each of the material support is respectively driven to move horizontally along a horizontal direction by a separate first horizontal mechanism, wherein a position to which the material support is moved is defined as a first position, and a position to which the material support is moved is defined as a second position, and the first position is a feeding position and the second position is a material returning position;

wherein at least one material storage platform is installed on the material support, at least one set of material storage seats is installed on the material storage platform, each set of the material storage seats is composed of five material storage seats arranged in parallel with each other, and the five storage seats are in one-to-one correspondence with five different positions of a silicon steel sheet iron core assuming a 曰-shape, and configured to store five different positions of the silicon steel sheet stack, the storage seat comprises a material storage frame, a plurality of material storage rollers arranged in parallel with each other are installed in the material storage frame, the platen is placed on the material storage rollers, and the material storage rollers are driven by a motor to rotate and drive the platen to move horizontally;

when the material support is moved to the first position, a transition vehicle is further provided beside the material support, the transition vehicle comprises a transition support configured to be driven by a second horizontal mechanism to move horizontally along the horizontal direction, a movement direction of the transition support is parallel to a movement direction of the material support, a transition platform is installed on the transition support, five s material transition seats in one-to-one correspondence with the five storage seats in a same set of material storage seats are installed on the transition platform, the material transition seat comprises a material transition frame, a plurality of material transition rollers arranged in parallel with each other are installed in the material transition frame, and the material transition rollers are driven by a transition motor to rotate;

the guide rail comprises a reclaiming guide rail located at the reclaiming area, a loading guide rail located at the loading area, a middle guide rail connecting the reclaiming guide rail to the loading guide rail, and a stacking guide rail that is located at the loading unit;

there are a plurality of reclaiming guide rails, wherein the plurality of reclaiming guide rails are respectively provided beside each of the material support, the reclaiming guide rail is composed of a plurality of first transverse guide rails and first longitudinal guide rails, the skip car is moved by a | ˙ -shaped (| ˙ is a Chinese character) movement trajectory on the reclaiming guide rail, and two vertices of the 匚 -shaped trajectory are respectively in one-to-one correspondence with the feeding position and the material returning position of the material support;

there is one loading guide rail, wherein the loading guide rail is provided at the side of the loading unit, the loading guide rail is composed of a plurality of second transverse guide rails and second longitudinal guide rails, the skip car is moved by a square shaped trajectory on the loading guide rail;

the middle guide rail is formed by a third transverse guide rail and a third longitudinal guide rail that are arranged in a staggered manner and connected with each other, wherein, there is one third longitudinal guide rail, and there are a plurality of third transverse guide rails, the third transverse guide rail is in one-to-one correspondence with the reclaiming guide rail, and a first side of the third transverse guide rail is in one-to-one connection with each of the reclaiming guide rails, a second side of the third transverse guide rail is connected to a side of the third longitudinal guide rail along a width direction, a side of the third longitudinal guide rail along a long axis direction is connected to a first side of the loading guide rail;

the stacking guide rail comprises a fourth longitudinal guide rail, and the fourth longitudinal guide rail is connected to a second side of the loading guide rail;

the skip car comprises a frame, walking wheels are respectively installed at four corners at a bottom of the frame, and the walking wheels are hinged with the frame, each walking wheel is driven to swing 90° by a separate swinging cylinder installed on the frame, to drive the walking wheel to swing back and forth in a horizontal direction and a vertical direction, and cooperate with the transverse guide rail or the longitudinal guide rail, achieving a switching of the skip car between the transverse guide rail and longitudinal guide rail, a pair of lifting oil cylinders are installed at two sides of the frame, and configured to cooperate with each other to drive the frame to lift up and down, so as to drive the walking wheel to detach or contact the guide rail;

a material receiving platform is further installed at a top of the frame, five material receiving seats in one-to-one correspondence with the storage seats are installed on the material receiving platform, the material receiving seat comprises a material receiving frame and a plurality of material receiving rollers installed in the material receiving frame, the material receiving rollers are driven to rotate by a motor installed on the material receiving platform;

the material receiving platform comprises a rotating platform located in a middle and a translation platform that is located on two sides, wherein, three material receiving seats arranged in parallel with each other are installed on the rotating platform, and one material receiving seat is placed on each of the translation platform, the rotating platform is driven to rotate by a rotating motor installed on the frame, and the translation platform is driven by a third horizontal mechanism to move horizontally, thereby approaching or departing from the rotating platform.

Further, two material storage platforms are installed on the material support, and the two material storage platforms are sequentially installed on the material support from top to bottom, the transition platform is driven by a scissor lift that is installed on the transition support for lifting, thereby achieving a connection between the transition platform and the two material storage platforms.

Further, a plurality of guiding plates that are arranged in parallel with each other are further connected to the guide rail, and a pair of guiding through-holes are defined in the guiding plates for piston rods of the lifting oil cylinders to pass through, each of the guiding plates is respectively located at a switching position of the skip car between the transverse guide rail and the longitudinal guide rail.

Further, the walking wheel comprises a wheel body, and an annular limiting side plate is further connected at a side of the wheel body, and a diameter of the annular limiting side plate is larger than a diameter of the wheel body.

An advantage of the present application is that through a mutual cooperation of the material warehouse, the skip car, and the guide rail, thereby achieving automatic feeding of the silicon steel sheet stack, without a need for manual handling and loading, greatly reducing manual labor and correspondingly improving a stacking efficiency.

A cooperation of the material warehouse, the guide rail, and the skip car utilizes the material warehouse to receive the silicon steel sheet stack cutting along a front transverse cutting line, and then connecting the material warehouse and the skip car through a cooperation of the transition vehicle to facilitate a smooth movement of the silicon steel sheet stack to the skip car, a movement of the skip car is further achieved through a cooperation of the guide rail, thus achieving automatic feeding, at the same time, the skip car with the silicon steel sheet material pile is directly used as the feeding unit to cooperate with the precision positioning unit, achieving stacking, without a need for manual handling in an entire process, which is very convenient.

A design of the guide rail adopts a combination of the reclaiming guide rail, the feeding guide rail, the middle guide rail, and the stacking guide rail, which can enable a plurality of the skip cars to move in a loop on the guide rail simultaneously without mutual interference, achieving continuous feeding and further improving stacking efficiency.

A design of the skip car adopts a hinged walking wheel that is cooperated with the swinging cylinder, through the back and forth swing of the walking wheel, the skip car can switch back and forth between the transverse guide rail and longitudinal guide rail, achieving smooth movement of the skip car on two different directions of the transverse guide rail and longitudinal guide rail, providing a foundation for feeding a stacking machine from different directions in a future; a design of the material receiving platform adopts a combination of the rotating platform and the translation platform, which allows the five silicon steel sheet stack that are arranged in parallel with each other to form five silicon steel sheet stack that are arranged in the ⊔-shaped through a rotation of the rotating platform, which provides a foundation for subsequent skip car to directly replace the loading unit and cooperate with the precision positioning unit.

The material support adopts a design of two material storage platforms, which can store more silicon steel sheet stack for a single material support, Lifting the transition platform by the use of the scissor lift aims to cooperate the two material storage platforms arranged above and below with each other, which can achieve docking of the material storage platforms at different heights and facilitate the docking of the platen between the material storage platform and the skip car.

Providing the guiding plate on the guide rail aims to cooperate with the lifting oil cylinder on the skip car, so that when the lifting oil cylinders drive the skip car to lift up and down, it can play a guiding role for a position of the skip car, ensuring a stability of the position of the skip car during track switching and avoiding a phenomenon of derailment of the skip car.

A design of the walking wheel adopts a joint cooperation of the wheel body and the limiting side plate plus a cooperation of the limiting side plate to limit a relative position between the wheel body and the guide rail, avoiding deviation of the walking wheel when walking on the guide rail, ensuring a smooth walking of the skip car.

BRIEF DESCRIPTION OF THE DRAWINGS

The present application will be further described in detail below with reference to accompanying drawings.

DETAILED DESCRIPTION

The following embodiment enables those skilled in the art to have a more comprehensive understanding of the present application, not intended to limit the present application within a scope of the described embodiment.

An automatic high-speed stacking machine is shown in FIGS. 1 to 5, including a loading unit, a precision positioning unit, a stacking unit and a grabbing unit. One loading unit is located in a middle position, a total of two precision positioning units are located at two sides of the loading unit, a total of two stacking units are located at two sides of the two precision positioning units, respectively, so that an entire automatic stacking system is sequentially provided with the loading unit, the precision positioning unit, and the stacking unit from a middle portion to two sides. In one embodiment, a layout of the loading unit, the precision positioning unit, and the stacking unit are the same as that of a precision positioning unit, a stacking unit, and a grabbing unit in an automatic stacking system for silicon steel sheet iron core mentioned in patent CN113593875, and thus will not be elaborated herein again.

Figure 1:
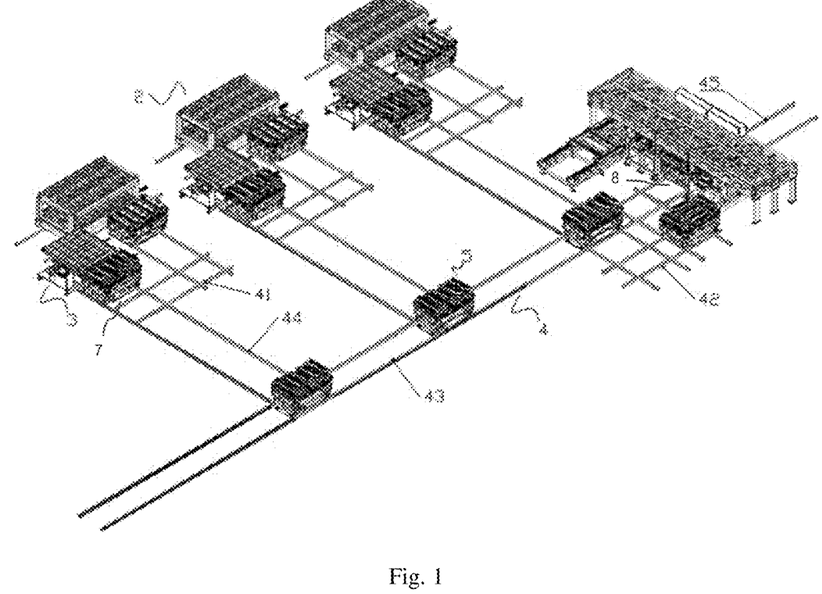
FIG. 1 is a schematic view of an automatic high-speed stacking machine of the present application.

The automatic high-speed stacking machine further includes a feeding unit configured to feed materials to the automatic high-speed stacking machine, including a platen 1, which is configured to receive silicon steel sheet stacks. The platen 1 is a hollow rectangular board.

A material warehouse 2 is configured to store the platen 1 with the silicon steel sheet stack. The material warehouse 2 includes three material supports 21 that are arranged in parallel with each other, each of the three material supports 21 is respectively driven to move horizontally along a horizontal direction by a separate first horizontal mechanism. A position to which the material support 21 is moves is defined as a first position, and a position to which the material support 21 is moved to is defined as a second position. The first position is a feeding position and the second position is a material returning position.

Figure 2:
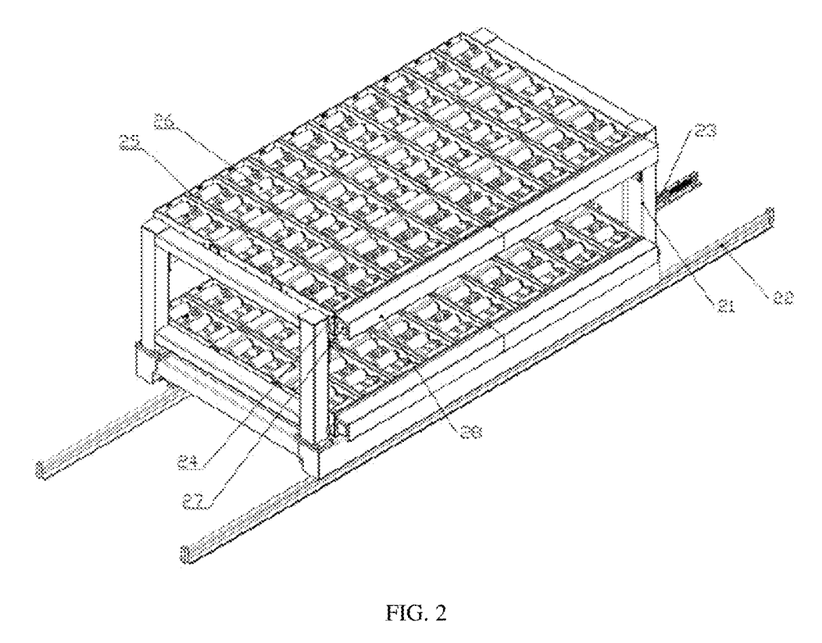
FIG. 2 is a schematic view of a material support of the present application.

As shown in a schematic view in FIG. 2, for the first horizontal mechanism, a pair of first guide rails 22 that are arranged in parallel with each other are installed at bottom ends of the material supports 21, the first guide rails are directly fixed on the ground, a first slide block configured to be used in conjunction with the first guide rail 22 is further installed at a bottom of the material support 21, a first rack 23 is further installed between the two first guide rails 22, an extension direction of the first rack 23 is same as that of first guide rail 22, and a first gear engaged with the first rack 23 is further installed at a bottom of the material support 21. The first gear is driven to rotate by a first motor which is installed on the material support 21, thereby driving the material support 21 to move horizontally along the first guide rail 22, achieving a back and forth movement of the material support 21 between the first and second positions.

The material support 21 is a hollow rectangular frame structure, and a pair of material storage platforms 24 are installed on the material support 21, and are sequentially installed on the material support 21 from top to bottom. The material support 21 consisting of two material storage platforms 24, as a single material support 21, can store more silicon steel sheet stacks.

Two sets of material storage seats are installed on the material storage platforms 24, and are arranged in parallel with each other along a movement direction of the material support 21. Each set of material storage seats is composed of five storage seats that are arranged in parallel with each other along the movement direction of the material support 21, the five storage seats is in one-to-one correspondence with five different positions of silicon steel sheet iron core that form a 日-shape (日 is a Chinese character), and the five storage seats are respectively configured to store five different positions of the silicon steel sheet stacks.

The material storage seat includes a material storage frame 25, which is a square frame, a plurality of material storage rollers 26 arranged in parallel with each other are installed in the material storage frame 25, and a distribution direction of the material storage rollers 26 is perpendicular to an arrangement direction of each storage seat, two ends of the material storage roller 26 are installed on an inner wall of the material storage frame 25 through cooperation of bearings, and the platen 1 is placed on the material storage rollers 26. The material storage rollers 26 are driven to rotate by a second motor 27 which is installed on the material storage platform 24, and the material storage rollers 26 drive the platen 1 to move horizontally. A chain wheel is respectively connected to each end of individual material storage rollers 26, and the chain wheels on individual material storage rollers 26 within a same material storage frame 25 are connected through a same synchronous chain to achieve common movement, wherein any one of the material storage rollers 26 is driven by the second motor 27 to rotate, thereby driving all the material storage rollers 26 to rotate synchronously and in a same direction, further driving the platen 1 to perform horizontal transportation.

The second motors 27 corresponding to each of the material storage seats on a same material storage platform 24 are all installed on a same side of the material storage platform 24, and a protecting plate 28 which covers all the second motors 27 is further installed at a side end of the material storage platform 24. Providing of the protecting plate 28 can play a protective role for the second motor 27, reducing a damage caused by external solid particles to the second motor 27.

When the material support 21 moves to the first position, a transition vehicle 3 is further provided on a side of the material support 21. As shown in a schematic view in FIG. 3, the transition vehicle 3 includes a transition support 31, which is driven by a second horizontal mechanism to move horizontally along the horizontal direction, and a movement direction of the transition support 31 is parallel to a movement direction of the material support 21. For the second s horizontal mechanism, a pair of second guide rails 32 are installed at a bottom end of the transition support 31, an extension direction of the second guide rail 32 is same as that of the first guide rail 22, a second slide block is further installed at a bottom of the transition support 31, the second slide block is used in conjunction with the second guide rail 32, and a second rack is further installed between the two second guide rails 32, an extension direction of the second rack is same as that of the second guide rail 32, a second gear is further installed at the bottom of the transition support 31, and the second gear is engaged with the second rack, the second gear is driven to rotate by a third motor which is installed on the transition support 31, thereby driving the transition support 31 to move back and forth along the extension direction of the second guide rail 32, making it convenient for the transition support 31 to connect with the material support 21, achieving a material reception of the platen 1, or connecting the transition support 31 with the transition vehicle 3 to achieve a conveying of the platen 1.

Figure 3:
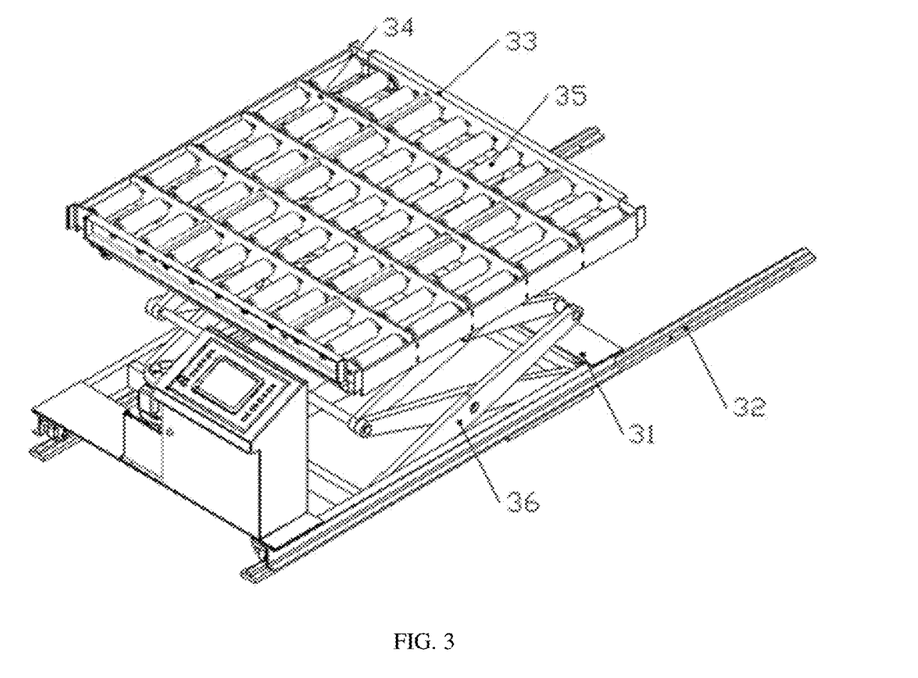
FIG. 3 is a schematic view of a transition vehicle of the present application.

A transition platform 33 is installed on the transition support 31, and five material transition seats corresponding to the five storage seats in a same set of material storage seats are installed on the transition platform 33, the material transition seat includes a transition frame 34, a plurality of transition rollers 35 arranged in parallel with each other are installed in the transition frame 34, two sides of the transition roller 35 are installed on the transition frame 34 through cooperation of bearings, the transition rollers 35 are driven by a transition motor to rotate, the chain wheel is installed at a side end of the transition roller 35, the chain wheels on individual transition roller 35 within a same transition frame 34 are connected through the same synchronous chain to achieve common movement, wherein any one of the transition rollers 35 is driven to rotate by the transition motor which is installed on the transition platform 33, further driving all the transition rollers 35 to rotate synchronously and in the same direction, thereby achieving a transportation of the platen 1 on the transition roller 35.

The transition platform 33 is driven by a scissor lift 36 which is installed on the transition support 31 for lifting, thereby achieving docking between the transition platform 33 and the two material storage platforms 24. Lifting the transition platform 33 by the use of the scissor lift 36 aims to cooperate the two material storage platforms 24 arranged above and below with each other, which can achieve docking of the material storage platforms 24 at different heights and facilitate the docking of the platen 1 between the material storage platform 24 and a skip car.

An area beside the material warehouse 2 is defined as a reclaiming area 7, and an area beside the loading unit is defined as a loading area 8.

The skip car 5, moving back and forth between the reclaiming area 7 and the loading area 8, is configured to take out and send the platen 1 containing the silicon steel sheet stacks from the material warehouse 2 to the loading area 8, or send an empty platen 1 back to the material warehouse 2.

A guide rail 4 is configured to provide a path for the skip car 5 to be moved back and forth between the reclaiming area 7 and the loading area 8.

The guide rail 4 includes a reclaiming guide rail 41 which is located at the reclaiming area 7, a loading guide rail 42 which is located at the loading area 8, a middle guide rail connecting the reclaiming guide rail 41 and the loading guide rail 42, and a stacking guide rail 45 which is located at the loading unit.

There are a plurality of reclaiming guide rails 41, which are respectively provided beside each of individual material supports 21, and the reclaiming guide rail 41 is composed of a plurality of first transverse guide rails and first longitudinal guide rails. The skip car achieves a | ˙ -shaped (| ˙ is a Chinese character) movement trajectory on the reclaiming guide rail 41, and two vertices of the | ˙ -shaped trajectory are respectively in one-to-one correspondence with a feeding position and a material returning position of the material support 21.

There is one loading guide rail 42 which is provided beside the loading unit, the loading guide rail 42 is composed of a plurality of second transverse guide rails and second longitudinal guide rails. The skip car achieves a movement of the square shaped trajectory on the loading guide rail 42.

The middle guide rail is formed by a third transverse guide rail 44 and a third longitudinal guide rail 43 that are connected with each other and arranged in a staggered manner, wherein, there is one third longitudinal guide rail 43, and there are a plurality of third transverse guide rails 44, each of the third transverse guide rails 44 is in one-to-one correspondence with each of the reclaiming guide rails 41, and a side of the third transverse guide rail 44 is in one-to-one connection with each reclaiming guide rail 41, another side of the third transverse guide rail 44 is connected to a side end of the third longitudinal guide rail 43 along a width direction, the third transverse guide rail 44 passes through the third longitudinal guide rail 43, forming an octothorpe shaped connection at a connection between the third transverse guide rail 44 and the third longitudinal guide rail 43, and a side of the third longitudinal guide rail 43 along a long axis direction is connected to a side of the loading guide rail 42.

The stacking guide rail 45 includes a fourth longitudinal guide rail, which is connected to another side of the loading guide rail 42.

Figure 4:
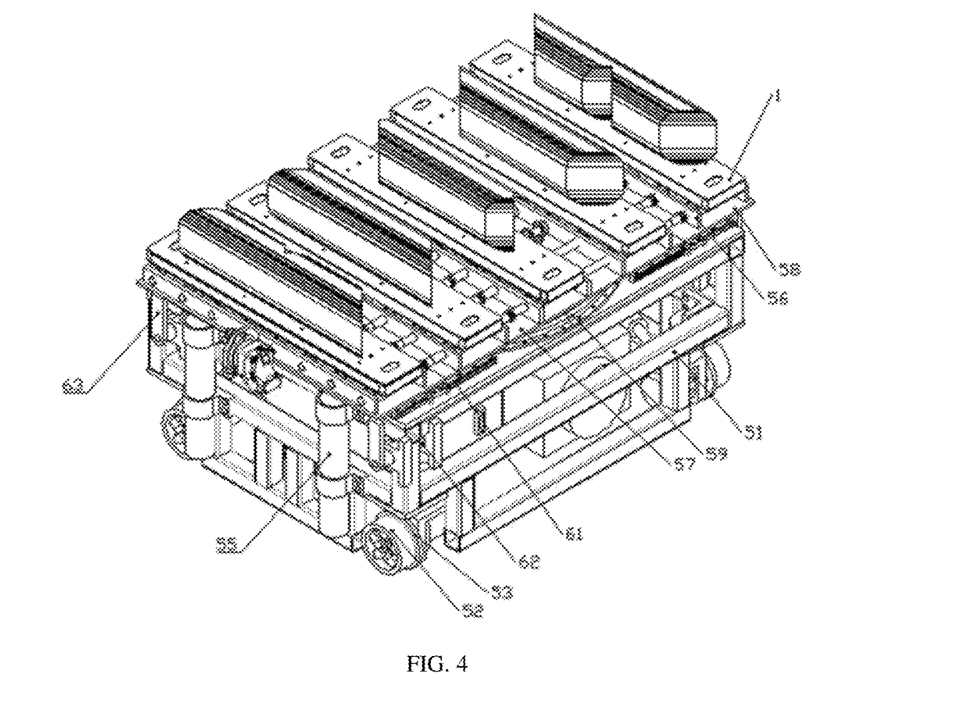
FIG. 4 is a schematic view of a skip car of the present application.
Figure 5:
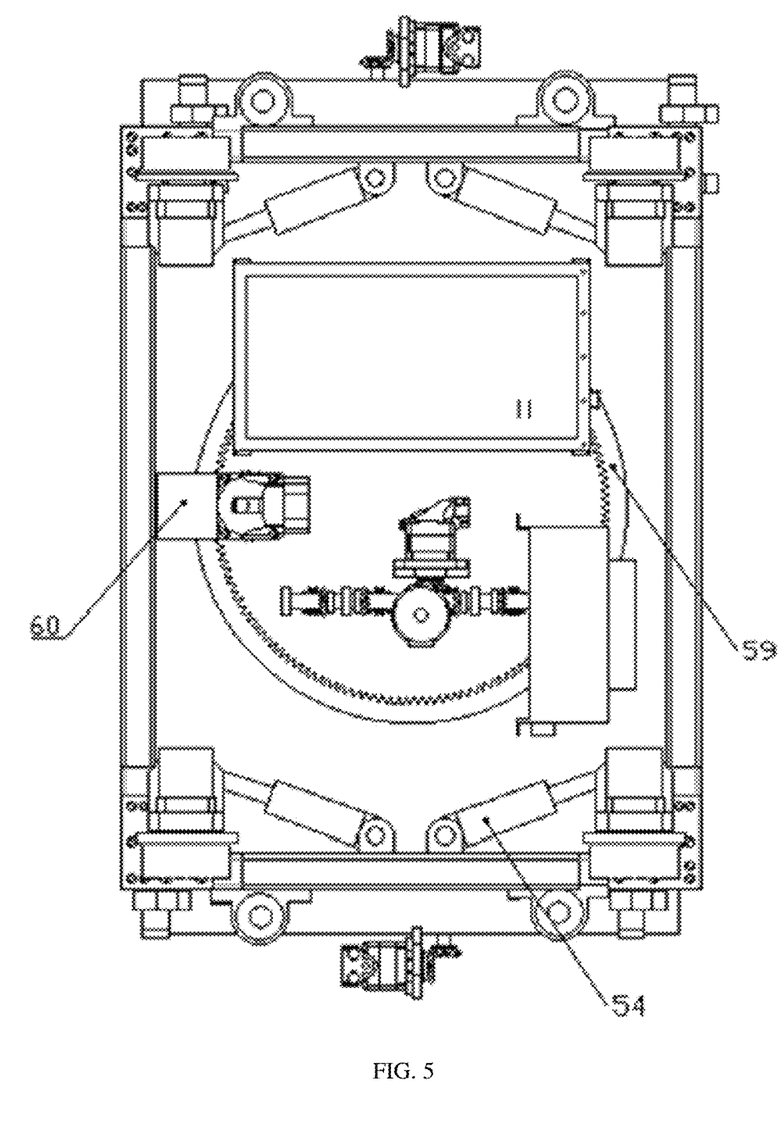
FIG. 5 is a bottom view of the skip car of the present application.

As shown in schematic views in FIGS. 4 and 5, it can be seen that the skip car 5 includes a frame 51, the frame 51 is the hollow rectangular frame structure, walking wheels are respectively installed at four corners at a bottom of the frame 51, and the walking wheels are hinged with the frame 51, and each of the walking wheels is driven to swing 90° by a separate swinging cylinder 54 which is installed on the frame 51. The walking wheel can swing back and forth in two horizontal and vertical directions, so as to enable the walking wheel to cooperate with each of the transverse guide rail and the longitudinal guide rail, achieving a switching of the skip car 5 between transverse guide rail and longitudinal guide rail. A pair of lifting oil cylinders 55 are installed at two sides of the frame 51, the lifting oil cylinders 55 are installed on the frame 51 upside down, and a cylinder body of the lifting oil cylinders 55 is fixed on the frame 51, configured to drive the frame 51 to lift up and down by a cooperation of the lifting oil cylinders 55, so as to cause the walking wheel to detach from or contact the guide rail 4.

The walking wheel includes a wheel body 52, and a limiting side plate 53 in a shape of a ring is further connected on a side of the wheel body 52. A diameter of the limiting side plate 53 is larger than that of the wheel body 52. A design of the walking wheel adopts a joint cooperation of the wheel body 52 and the limiting side plate 53 plus a cooperation of the limiting side plate 53 to limit a relative position between the wheel body 52 and the guide rail 4, avoiding deviation of the walking wheel when walking on the guide rail 4, ensuring a smooth walking of the skip car 5.

A plurality of guiding plates arranged in parallel with each other are connected to the guide rail 4, and a pair of guiding through-holes are defined in the guiding plates for piston rods of the lifting oil cylinders 55 to pass through, each of the guiding plates is respectively located at a switching position between the transverse guide rail and the longitudinal guide rail of the skip car 5. Providing the guiding plate on the guide rail 4 aims to cooperate with the lifting oil cylinder 55 on the skip car 5, so that when the lifting oil cylinders 55 drive the skip car 5 to lift up and down, it can play a guiding role for a position of the skip car 5, ensuring a stability of the position of the skip car 5 during track switching and avoiding derailment of the skip car 5.

A material receiving platform is further installed at a top of the frame 51, five material receiving seats in one-to-one correspondence with the material storage seats are provided on the material receiving platform, the material receiving seat includes a material receiving frame 56 and a plurality of material receiving rollers that are installed in the material receiving frame, the material receiving rollers are driven to rotate by a motor which is installed on the material receiving platform, two sides of the material receiving rollers are installed in the material receiving frame through cooperation of bearings, synchronous chain wheels are installed on side ends of the material receiving rollers, and the synchronous chain wheels on each of the material receiving rollers within a same material receiving seat are connected through the same synchronous chain, wherein any of the material receiving rollers is driven to rotate by the motor which is installed on the material receiving platform, thereby driving all the material receiving rollers to rotate synchronously and in the same direction.

The material receiving platform includes a rotating platform 57 located in a middle and a translation platform 58 located on two sides, wherein, three material receiving seats that are arranged in parallel with each other are installed on the rotating platform 57, and one material receiving seat is placed on each of the translation platforms 58.

The rotating platform 57 is driven to rotate by a rotating motor installed on the frame 51, a rotating plate 59 is further installed on the frame 51 to support the rotating platform 57, the rotating plate 59 is of a circular shape, the frame 51 is further defined with a circular through-hole for an inserting installation of the rotating plate 59, an inner wall of the rotating plate 59 has a toothed structure, gears that cooperate with the toothed structure of the rotating plate 59 are further installed on the frame 51, the gears are driven to rotate by the rotating motor 60 which is installed on the frame 51, further driving the rotating plate 59 to rotate, ultimately achieving a rotation of the rotating platform 57.

Due to a need for horizontal rotation of the rotating platform 57, the material receiving rollers that are installed in the three material receiving seats on the rotating platform 57 can be connected by shafts, so that the three material receiving rollers are connected in series with each other at a same horizontal position. In this way, only one motor is needed to achieve synchronous rotation of the material receiving rollers in the three material receiving seats, reducing a number of the motors and providing convenience for the rotation of the rotating platform 57.

The translation platform 58 is driven by a third horizontal mechanism for horizontal movement, thereby approaching or departing from the rotating platform 57, the third horizontal mechanism is: a pair of third guide rails 61 that are arranged in parallel with each other are installed on the frame 51, the third guide rails 61 extend along a distribution direction of the translation platform 58 and the rotating platform 57, the third slide block which is used in conjunction with the third guide rail 61 is installed at a bottom of the translation platform 58, two sides of the translation platform 58 are driven to move horizontally along the third guide rail 61 by cylinders 62 that are installed on the frame 51, thereby achieving the translation platform 58 to approach or depart from the rotating platform 57, a piston rod of the cylinder 62 is connected to the translation platform 58 through a connecting rod 63.

Working principle is as follows. Firstly, the movement positions of individual components are determined, in which the first position is a position where the material support 21 moves to the feeding position and the second position is a position where the material support 21 moves to the material returning position, when the skip car 5 moves in the ⌐-shaped trajectory on the reclaiming guide rail 41, positions of the two vertices of the skip car moving to the ⌐-shaped trajectory are a third position corresponding to the feeding position and a fourth position corresponding to the material returning position, respectively. Two inflection points of the ⌐-shaped trajectory from the third position to the fourth position are a fifth position and a sixth position, respectively. When the skip car moves along the square shaped trajectory on the loading guide rail 42, four endpoints of the square shaped trajectory are sequentially a seventh position, an eighth position, a ninth position, and a tenth position, the seventh position is a connection between the loading guide rail 42 and the third longitudinal guide rail 43, and the tenth position is a connection between the loading guide rail 42 and the stacking guide rail 45.

When feeding the material, firstly, the material support 21 which is fully loaded with the silicon steel sheet stack moves to the first position, transporting the platen 1 loaded with five silicon steel sheet stack that make up a same ⊟-shaped silicon steel sheet iron core from the material support 21 to the transition vehicle 3 sequentially, at the same time, an empty skip car waiting in the third position in advance, the transition vehicle 3 transports five platens 1 that are loaded with the silicon steel sheet stack to the skip car 5, at this time, the five platens 1 are still arranged in parallel with each other in a same direction, after receiving the platen 1 on the skip car 5, the skip car 5 moves from the third position to the fourth position, then from the fourth position to the third transverse guide rail 44, and then from the third transverse guide rail 44 to the third longitudinal guide rail 43, when the skip car 5 moves to a staggered connection between the third transverse guide rail 44 and the third longitudinal guide rail 43, the lifting oil cylinders 55 works, pushing the skip car 5 upwards as a whole, causing a walking car to detach from the third transverse guide rail 44, then, the swinging cylinder 54 drives the walking wheel to rotate 90°, then the lifting oil cylinders 55 works, causing the skip car 5 to move downwards as a whole, causing the skip car 5 to fall on the third longitudinal guide rail 43, then the skip car 5 moves along the third longitudinal guide rail 43, when the skip car 5 moves to the seventh position, the skip car 5 changes a track again, moving from the seventh position to the eighth position, and then changes the track again, moving from the eighth position to the ninth position, when the skip car moves to the ninth position, it is a loading waiting area, at this position, the two translation platforms 58 move to two sides respectively, then, the rotating platform 57 rotates 90°, after a rotation of the rotating platform 57, the translation platform 58 resets, at this time the five platens 1 should be arranged in ⊔-shape, then the skip car 5 moves to the tenth position again, finally, it moves from the tenth position to the stacking guide rail 45, and moves along the stacking guide rail 45 to between two precision positioning units, at this time, the skip car 5 is used as the loading unit, and the lifting oil cylinder 55 is configured to push the skip car 5 up as a whole to feed the material for the two precision positioning units, achieving lamination, a stacking principle is a same as that in patent CN113593875, which is not detailed in the present application.

When a first skip car is stacking, a second skip car moves along a same path to the ninth position to wait for stacking, and the third skip car moves to the eighth position to wait for stacking.

After a completion of the stacking of the first skip car 5, at this time, the platen 1 is in an unloaded state, at this time, the skip car moves from the stacking guide rail 45 to the tenth position, then directly moves from the tenth position to the seventh position, and then passes through the third longitudinal guide rail 43 and the third transverse guide rail 44 from the seventh position sequentially and returns to the fifth position, then, it moves from the fifth position to the sixth position, and then moves from the sixth position to the fourth position, at the fourth position, the rotating platform 57 rotates and resets again, restoring the five platens 1 to the same direction and be arranged in parallel, then, the material support 21 moves to the second position, and the skip car 5 sends the empty platen 1 back to the material support 21, completing an entire cycle.

Those skilled in the art should understand that the present application is not limited by the embodiment mentioned above, the descriptions in the embodiment and the description mentioned above only illustrate the principle of the present application, without departing from the spirit and scope of the present application, there may be various changes and improvements in the present application, all of which fall within the scope of protection claimed by the present application. The scope of protection claimed by the present application is defined by the accompanying claims and their equivalents.

What is claimed is:

1. An automatic stacking machine, comprising a loading unit, two precision positioning units, two stacking units, and a grabbing unit, wherein the loading unit is located in a middle position, the two precision positioning units are respectively located at two sides of the loading unit, and the two stacking units are respectively located at two sides of the two precision positioning units, so that the loading unit, the two precision positioning units, and the two stacking units are sequentially arranged from a middle portion to two sides of the automatic stacking machine, further comprising:
    a platen, configured to receive a silicon steel sheet stack;
    a material warehouse, configured to store the platen having the silicon steel sheet stack, wherein an area beside the material warehouse is defined as a reclaiming area, and an area beside the loading unit is defined as a loading area;
    a skip car moving back and forth between the reclaiming area and the loading area, configured for fetching and sending the platen having the silicon steel sheet stack from the material warehouse to the loading area, or for sending an empty platen back to the material warehouse, wherein the skip car is used as the loading unit when the skip car moves to the loading area; and
    a guide rail, configured to provide a path for the skip car to move back and forth between the reclaiming area and the loading area.

2. The automatic stacking machine according to claim 1, wherein the material warehouse comprises a plurality of material supports that are arranged in parallel with each other, and each of the plurality of material supports is respectively driven to move horizontally along a horizontal direction by a separate first horizontal mechanism, wherein a first position to which each of the plurality of material supports is moved is defined as a first position, and a second position to which each of the plurality of material supports is moved is defined as a second position, and the first position is a feeding position and the second position is a material returning position;
    wherein at least one material storage platform is installed on each of the plurality of material supports, at least one set of material storage seats is installed on the at least one material storage platform, each set of the at least one set of material storage seats is composed of five material storage seats arranged in parallel with each other, and the five material storage seats are in one-to-one correspondence with five different positions of a silicon steel sheet iron core having a ⊟-shape, and configured to store five different positions of the silicon steel sheet stack, each of the five material storage seats comprises a material storage frame, a plurality of material storage rollers arranged in parallel with each other are installed in the material storage frame, the platen is placed on the plurality of material storage rollers, and the plurality of material storage rollers are driven by a motor to rotate and drive the platen to move horizontally;
    when each of the plurality of material supports is moved to the first position, a transition vehicle is further provided beside a corresponding one of the plurality of material supports, the transition vehicle comprises a transition support configured to be driven by a second horizontal mechanism to move horizontally along the horizontal direction, a movement direction of the transition support is parallel to a movement direction of the corresponding one of the plurality of material supports, a transition platform is installed on the transition support, five material transition seats in one-to-one correspondence with the five material storage seats in a same set of the at least one set of material storage seats are installed on the transition platform, each of the five material transition seats comprises a material transition frame, a plurality of material transition rollers arranged in parallel with each other are installed in the material transition frame, and the plurality of material transition rollers are driven by a transition motor to rotate;

the guide rail comprises a reclaiming guide rail located at the reclaiming area, a loading guide rail located at the loading area, a middle guide rail connecting the reclaiming guide rail to the loading guide rail, and a stacking guide rail that is located at the loading unit;
there are a plurality of reclaiming guide rails, wherein the plurality of reclaiming guide rails are respectively provided beside each of the plurality of material supports, each of the plurality of reclaiming guide rails is composed of a plurality of first transverse guide rails and first longitudinal guide rails, the skip car is moved by a ⌊⌋-shaped movement trajectory on a corresponding one of the plurality of reclaiming guide rails, and two vertices of the ⌊⌋-shaped trajectory are respectively in one-to-one correspondence with the feeding position and the material returning position of the corresponding one of the plurality of material supports;
there is only one of the loading guide rail, wherein the loading guide rail is provided at a side of the loading unit, the loading guide rail is composed of a plurality of second transverse guide rails and second longitudinal guide rails, and the skip car is moved by a square shaped trajectory on the loading guide rail;
the middle guide rail is formed by a plurality of third transverse guide rails and a third longitudinal guide rail arranged in a staggered manner and connected with each other, wherein, there is only one of the third longitudinal guide rail, the plurality of third transverse guide rails are in one-to-one correspondence with the plurality of reclaiming guide rails, and a first side of one of the plurality of third transverse guide rails is in one-to-one connection with each of the plurality of reclaiming guide rails, a second side of the one of the plurality of third transverse guide rails is connected to a first side of the third longitudinal guide rail along a width direction, a second side of the third longitudinal guide rail along a long axis direction is connected to a first side of the loading guide rail, the stacking guide rail comprises a fourth longitudinal guide rail, and the fourth longitudinal guide rail is connected to a second side of the loading guide rail;
the skip car comprises a frame, walking wheels are respectively installed at four corners at a bottom of the frame, and the walking wheels are hinged with the frame, each of the walking wheels is driven to swing 90° by a separate swinging cylinder installed on the frame to drive a corresponding one of the walking wheels to swing back and forth in the horizontal direction and a vertical direction and cooperate with the transverse guide rail or the longitudinal guide rail, achieving a switching of the skip car between the transverse guide rail and longitudinal guide rail, a pair of lifting oil cylinders are installed at two sides of the frame, and the pair of lifting oil cylinders configured to cooperate with each other to drive the frame to lift up and down, so as to drive the corresponding one of the walking wheels to detach from or contact the guide rail; and
a material receiving platform is further installed at a top of the frame, five material receiving seats in one-to-one correspondence with the five material storage seats are installed on the material receiving platform, each of the five material receiving seats comprises a material receiving frame and a plurality of material receiving rollers installed in the material receiving frame, the plurality of material receiving rollers are driven to rotate by a second motor installed on the material receiving platform, the material receiving platform comprises a rotating platform located in a middle of the material receiving platform and translation platforms that are located on two sides of the material receiving platform, wherein, three of the five material receiving seats arranged in parallel with each other are installed on the rotating platform, and one of the five material receiving seat is placed on each of the translation platforms, the rotating platform is driven to rotate by a rotating motor installed on the frame, and the translation platforms are driven by a third horizontal mechanism to move horizontally, thereby approaching or departing from the rotating platform.

3. The automatic stacking machine according to claim 2, wherein the at least one material storage platform is two material storage platforms, and the two material storage platforms are sequentially installed on each of the plurality of material supports from top to bottom, and the transition platform is driven to lift up and down by a scissor lift installed on the transition support, thereby achieving docking between the transition platform and the two material storage platforms.

4. The automatic stacking machine according to claim 2, wherein, a plurality of guiding plates arranged in parallel with each other are further connected to the guide rail, and a pair of guiding through-holes are defined in the plurality of guiding plates for piston rods of the pair of lifting oil cylinders to pass through, each of the plurality of guiding plates is respectively located at a switching position of the skip car between the transverse guide rail and the longitudinal guide rail.

5. The automatic stacking machine according to claim 2, wherein, each of the walking wheels comprises a wheel body, and an annular limiting side plate is further connected at a side of the wheel body, and a diameter of the annular limiting side plate is larger than a diameter of the wheel body.

\* \* \* \* \*